(12) United States Patent
Swope

(10) Patent No.: US 10,817,682 B2
(45) Date of Patent: Oct. 27, 2020

(54) ANTENNA ASSEMBLY FOR AN RFID READER

(71) Applicant: Zebra Technologies Corporation, Lincolnshire, IL (US)

(72) Inventor: Charles Burton Swope, Coral Springs, FL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/208,214

(22) Filed: Dec. 3, 2018

(65) Prior Publication Data

US 2020/0175237 A1     Jun. 4, 2020

(51) Int. Cl.
| | |
|---|---|
| *H01Q 1/36* | (2006.01) |
| *G06K 7/10* | (2006.01) |
| *H01Q 1/22* | (2006.01) |
| *H01Q 11/08* | (2006.01) |

(52) U.S. Cl.
CPC ....... *G06K 7/10366* (2013.01); *H01Q 1/2216* (2013.01); *H01Q 11/08* (2013.01)

(58) Field of Classification Search
CPC .. G06K 7/10366; H01Q 1/2216; H01Q 11/08; H01Q 1/362
USPC .......................................... 235/451; 343/893
See application file for complete search history.

(56) References Cited

U.S. PATENT DOCUMENTS

| | | | | |
|---|---|---|---|---|
| 6,407,720 | B1 * | 6/2002 | Josypenko | H01Q 11/08 343/895 |
| 2006/0164322 | A1 * | 7/2006 | Lan | H01Q 1/362 343/895 |
| 2012/0133568 | A1 * | 5/2012 | Lafleur | H01Q 1/362 343/833 |
| 2016/0204503 | A1 * | 7/2016 | Faraone | H01Q 1/362 343/893 |
| 2019/0245268 | A1 * | 8/2019 | Packer | H01Q 1/362 |

\* cited by examiner

*Primary Examiner* — Daniel A Hess
(74) *Attorney, Agent, or Firm* — Yuri Astvatsaturov

(57) ABSTRACT

An antenna assembly for a radio frequency identification (RFID) reader includes: a support member having an inner surface and an opposing outer surface; a first bifilar helical antenna element wound about a first helical axis extending from the outer surface of the support member, wherein the first helical axis is exclusive to the first helical antenna element; a first control terminal on the support member, electrically connected with the first bifilar helical antenna element; a second bifilar helical antenna element wound about a second helical axis extending from the outer surface of the support member, wherein the second helical axis is exclusive to the second helical antenna element; and a second control terminal on the support member, electrically connected with the second bifilar helical antenna element.

9 Claims, 4 Drawing Sheets

ANTENNA ASSEMBLY FOR AN RFID READER

BACKGROUND

Radio frequency identification (RFID) technology may be deployed in a variety of facilities, including retail stores, warehouses and the like, to track various types of objects. A typical RFID system includes an RFID reader or interrogator, and a plurality of RFID tags. The tags are typically associated with objects (e.g. items of clothing, boxes of inventory or the like) within the environment, and may be physically attached to such items. The RFID reader is configured to emit one or more radio frequency (RF) interrogation signals. At least one of the tags, upon receiving an interrogation signal, is configured to emit an RF response. The RFID reader, in turn, is configured to detect and demodulate the response. Potentially conflicting performance requirements may therefore be imposed on the antenna assembly of the RFID reader, which must both generate interrogation signals with adequate coverage of the facility, and also provide relatively narrow receive beams to detect tag responses. Further, the antenna assemblies of such RFID readers are typically subject to physical envelope and restrictions imposed by cost considerations.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
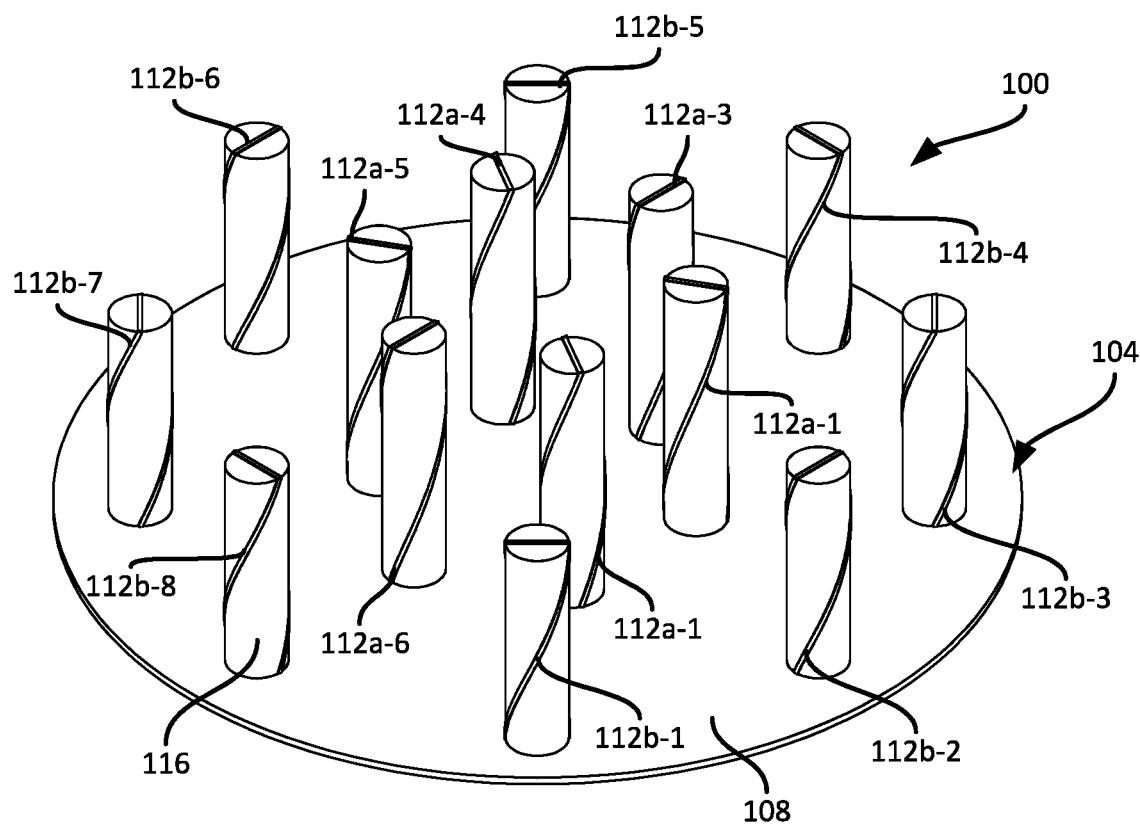
FIG. 1A is a top isometric view of an antenna assembly.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

At least some examples disclosed herein are directed to an antenna assembly for a radio frequency identification (RFID) reader, where the antenna assembly includes: a support member having an inner surface and an opposing outer surface; a first bifilar helical antenna element wound about a first helical axis extending from the outer surface of the support member, wherein the first helical axis is exclusive to the first helical antenna element; a first control terminal on the support member, electrically connected with the first bifilar helical antenna element; a second bifilar helical antenna element wound about a second helical axis extending from the outer surface of the support member, wherein the second helical axis is exclusive to the second helical antenna element; and a second control terminal on the support member, electrically connected with the second bifilar helical antenna element.

At least some other examples disclosed herein are directed to an RFID reader having: an antenna assembly that includes (i) a support member having an inner surface and an opposing outer surface, (ii) a first bifilar helical antenna element wound about a first helical axis extending from the outer surface of the support member, wherein the first helical axis is exclusive to the first helical antenna element, (iii) a first control terminal on the support member, electrically connected with the first bifilar helical antenna element, (iv) a second bifilar helical antenna element wound about a second helical axis extending from the outer surface of the support member, wherein the second helical axis is exclusive to the second helical antenna element, and (v) a second control terminal on the support member, electrically connected with the second bifilar helical antenna element; a transceiver connected to the first and second control terminals; and a controller connected to the transceiver, and configured to transmit data to the transceiver for emission via the antenna assembly.

FIG. 1A depicts antenna assembly 100 (also referred to simply as the assembly 100) for a radio frequency identification (RFID) reader. The assembly 100 can be coupled to an RFID controller (not shown) for emitting interrogation signals, also referred to as primary, or transmit, beams. The primary beams may be directed over at least a portion of a facility (e.g. a warehouse, healthcare facility, retail facility, or the like) in which the RFID reader and assembly 100 are deployed. One or more RFID tags within the facility, such as tags affixed to items (e.g. products, pallets, packages and the like), upon receipt of an interrogation signal, are configured to return a response signal containing, for example, a tag identifier and an associated data payload (e.g. a universal product code (UPC) corresponding to a product to which the tag is affixed). The assembly 100, in turn, can be controller by the RFID controller to detect the tag response(s) via one or more secondary beams, also referred to a receive beams.

The assembly 100 includes a support member 104 having a planar outer surface 108 and an opposing planar inner surface (not visible in FIG. 1A). In the present example, the support member 104 is generally circular, although in other examples the support member 104 can have a variety of other shapes (e.g. a rectangular support member can be employed in other embodiments). The support member 104 provides a ground plane for the antenna assembly 100 in the present example, and thus includes a conductive layer. For example, the support member 104 can be implemented as a printed circuit board (PCB) including at least one ground layer.

The support member 104 supports a plurality of bifilar helical antenna elements 112. The antenna elements 112 include at least a first antenna element 112 and a second antenna element 112. In the present example, the antenna elements 112 includes fourteen antenna elements, including a primary subset 112a of antenna elements 112a-1, 112a-2, 112a-3, 112a-4, 112a-5 and 112a-6, and a secondary subset 112*b* of antenna elements 112*b*-1, 112*b*-2, 112*b*-3, 112*b*-4, 112*b*-5, 112*b*-6, 112*b*-7 and 112*b*-8. Each of the antenna elements 112 is wound about a helical axis extending from the outer surface 108 of the support member 104. Of particular note, the helical axis of each antenna element 112 is exclusive to that antenna element 112. In other words, no antenna element 112 shares a helical axis with any other antenna element 112.

Each antenna element 112 is supported by a mast 116, illustrated in FIG. 1A as cylindrical members extending from and supported by the outer surface 108 of the support member 104. The masts 116, each of which is also exclusive to a corresponding antenna element 112, can be non-conductive structures (e.g. fabricated from insulating material such as PCB substrate or the like). The antenna elements 112 are supported on the outer surface of the corresponding masts 116 (e.g. as conductive traces deposited on the masts 116). In other examples, the masts 116 need not be cylindrical, but rather can have rectangular or other suitable cross sections. In further examples, the masts 116 may simply be omitted.

Figure 1B:
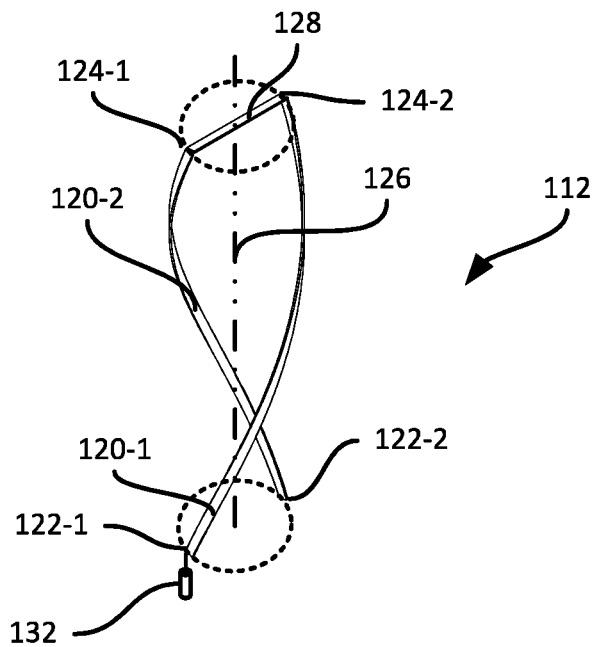
FIG. 1B is an isometric view of an antenna element of the assembly of FIG. 1A.

FIG. 1B illustrates an isolated antenna element 112. As noted above, each antenna element 112 is a bifilar helical antenna element. Accordingly, the antenna element 112 includes a first volute 120-1 wound from a first base 122-1 to a first summit 124-1 (e.g. atop the corresponding mast 116, omitted in FIG. 1B for clarity), and a second volute 120-2 wound from a second base 122-2 to a second summit 124-2. The first and second volutes 120 are wound about the above-mentioned helical axis 126. In the present example the axis 126 is perpendicular to the outer surface 108, but in other embodiments the axis 126 may be angled (i.e. at angles other than 90 degrees) relative to the outer surface 108.

In the illustrated example, the first and second volutes 120-1 and 120-2 traverse 180 degrees from their respective bases 122 to their respective summits 124. Further, the bases 122 and summits 124 are disposed on opposite sides of the axis 126. The first and second volutes 120-1 and 120-2 are joined at the summits 124 by a short circuit 128, which in the present example lies on an outer surface of the mast 116. One of the bases 122 (the base 122-1, in the present example) is connected, via any suitable electrical conduit (e.g. circuit traces defined on one or more conductive layers of a PCB) traversing the support member 104, to a control terminal 132, such as a coaxial port or the like, disposed on the inner surface of the support member 104.

Figure 2A:
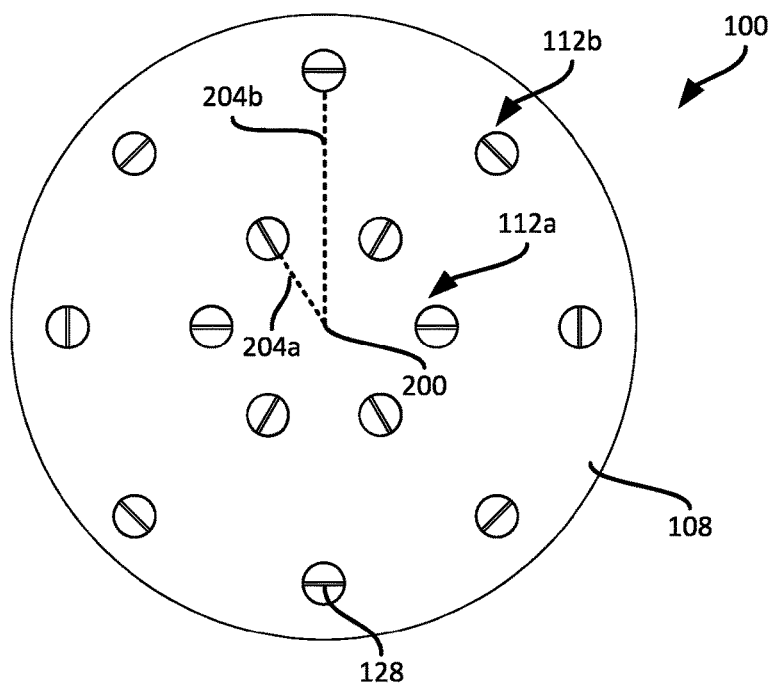
FIG. 2A is a top view of the assembly of FIG. 1A.

Turning to FIG. 2A, a top view of the assembly 100 is illustrated. As seen in FIG. 2A, the primary subset of antenna elements 112*a* are arranged in a ring about a center 200 of the outer surface 108, with each antenna element 112*a* being disposed at a primary radius 204*a* from the center 200. The antenna elements 112*a* of the primary subset are equally spaced from each other (e.g. forming a regular hexagon), although such spacing need not be equal in other embodiments. The secondary subset of antenna elements 112*b* are arranged in a ring about the center 200, with each antenna element 112*b* being disposed at a secondary radius 204*b* from the center 200. The secondary radius 204*b* is greater than the primary radius 204*a*.

Also visible in FIG. 2A are the orientations of the volutes 120 of each antenna element 112. In particular, recalling FIG. 1B, the bases 122-1 and 122-2 are aligned with the ends of the short 128, and thus the orientations of the shorts 128 in FIG. 2A are indicative of the positions of the bases 122 of each antenna element 112. As seen in FIG. 2A, the antenna elements 112*b* have shorts 128 arranged perpendicular to the radius 204*b*, while the antenna elements 112*a* have shorts 128 arranged parallel to the radius 204*a*. A wide variety of other orientations are also contemplated for the antenna elements 112, however.

Figure 2B:
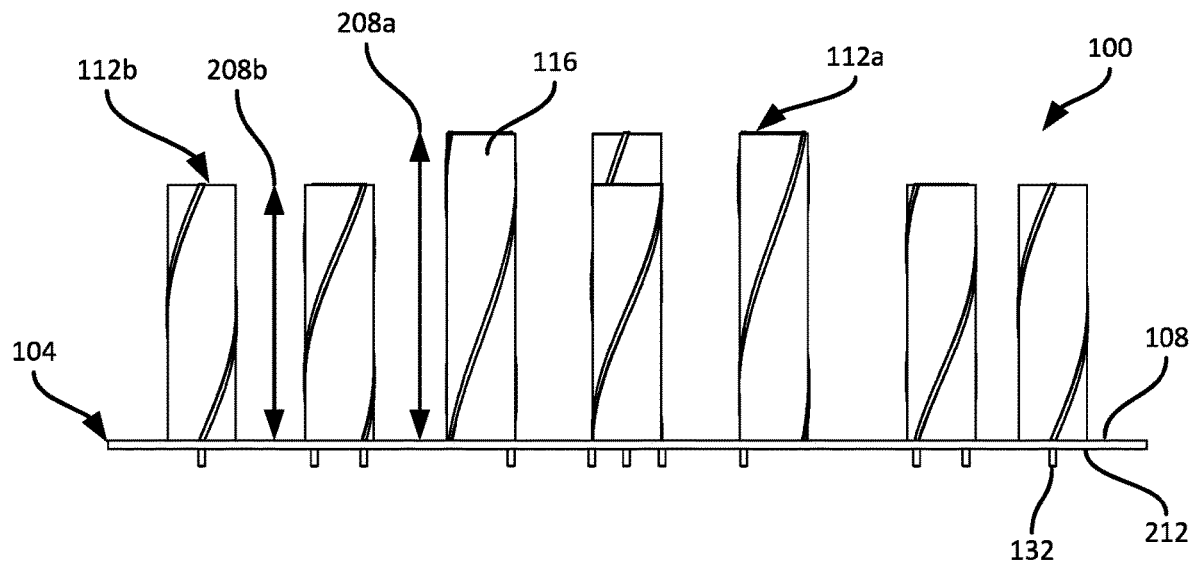
FIG. 2B is a front view of the assembly of FIG. 1A.

Referring to FIG. 2B, a front view of the assembly 100 is illustrated. As shown in FIG. 2B, the antenna elements 112*a* of the primary subset, as well as the corresponding masts 116, have a first height 208*a* (as measured from the outer surface 108 of the support member 104), which is greater than a second height 208*b* of the antenna elements 112*b* of the secondary subset. The increased height 208*a* of the antenna elements 112*a* may enable the generation of primary beams with greater beamwidth by the antenna elements 112*a*, in comparison to an implementation in which all the antenna elements 112 have a common height. In other embodiments, however, the antenna elements 112 may be implemented with a single common height, as will be discussed further below.

Figure 3A:
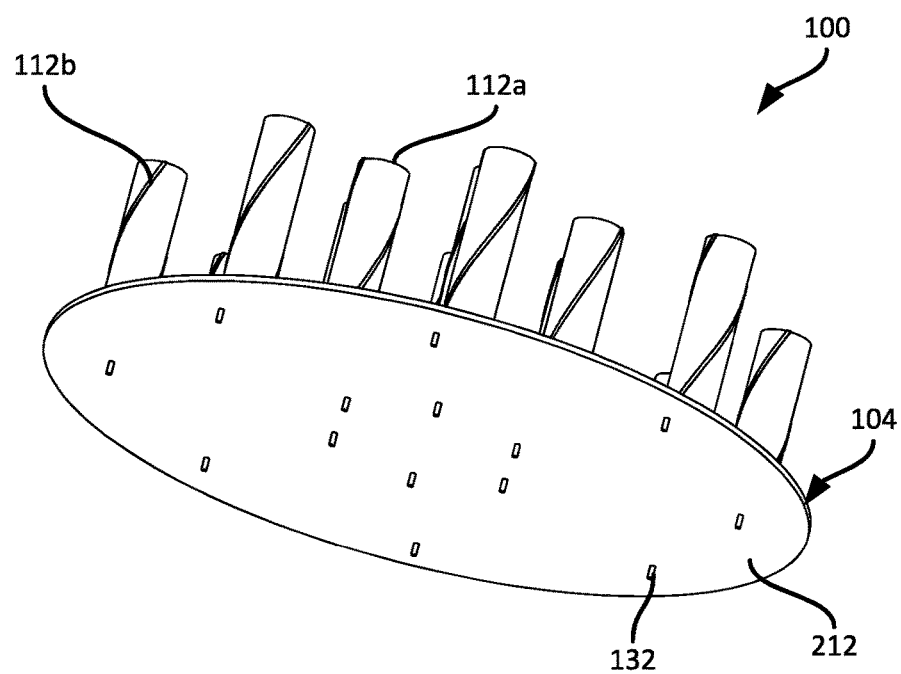
FIG. 3A is a bottom isometric view of the assembly of FIG. 1A.

Also visible in FIG. 2B are the above-mentioned control terminals 132, which are supported on an inner surface 212 of the support member 104. FIG. 3A is an isometric view of the assembly 100 from the bottom, illustrating the arrangement of the control terminals 132 in the present example. As seen in FIG. 3A, each terminal 132 is disposed on the inner surface 212 directly opposite the corresponding base 122 to which the terminal 132 is connected. In other examples, the terminals 132 need not be disposed as shown in FIG. 3A. Instead, the terminals 132 can be placed within a selected region of the inner surface 212, with feed lines extending within the support member 104 from each terminal 132 to the corresponding antenna element 112.

Figure 3B:
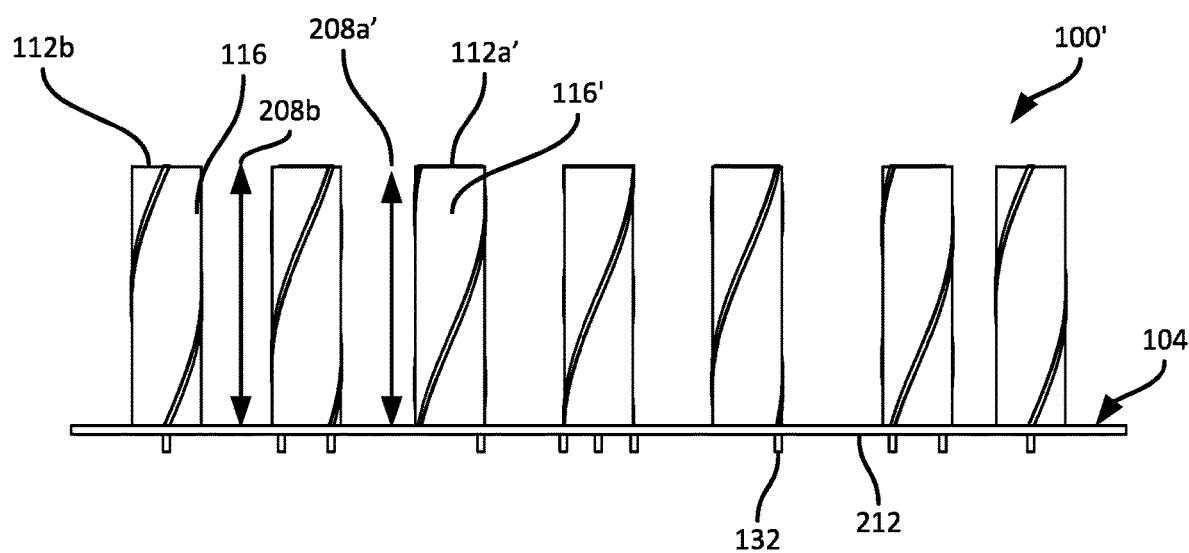
FIG. 3B is a front view of an antenna assembly according to another embodiment.

Variations to the structure of the assembly 100 noted above are contemplated. Referring to FIG. 3B, a front view of an assembly 100' according to another embodiment is shown. The assembly 100' includes the support member 104 as mentioned above, as well as the antenna elements 112*b* and corresponding masts 116 as described above. However, the antenna elements 112*a* have been replaced with antenna elements 112*a*' and corresponding masts 116', which have heights 208*a*' equal to the heights 208*b* of the antenna elements 112*b*.

Figure 4:
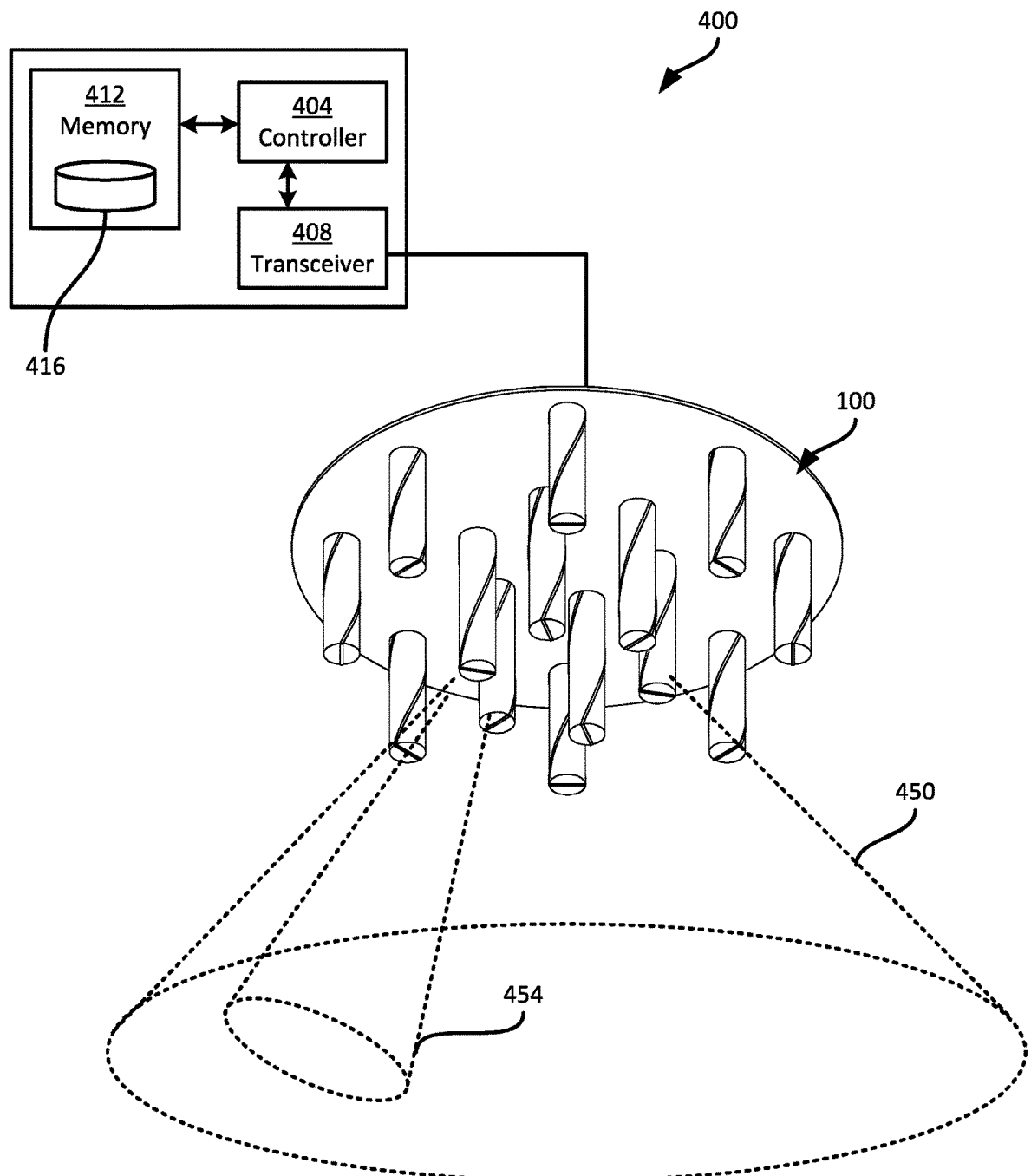
FIG. 4 is a block diagram of certain components of an RFID reader employing the antenna assembly of FIG. 1A.

Referring now to FIG. 4, an RFID reader 400 is illustrated, including the assembly 100 (although it will be apparent that the assembly 100', as well as other variants thereof, may be included in the RFID reader 400 in place of the assembly 100). The RFID reader 400 also includes a controller 404 (e.g. a baseband controller implemented as one or more integrated circuits) coupled with at least one transceiver 408 and a memory 412 (which may also be integrated with the controller 404). The controller 404, as will now be apparent to those skilled in the art, is configured to control the operation of the assembly 100 via the transceiver 408. In particular, the controller 404 can be configured to select, for example from a repository 416 of antenna weights in the memory 412, a weight vector (e.g. specifying an amplitude and phase angle) for each of the antenna elements 112. That is, the repository 416 can store distinct weights for each antenna element 112. Further, the repository 416 can store, for each antenna element, both a transmit weight and a receive weight.

Thus, to generate a primary beam 450 (e.g. for emitting an interrogation signal), the controller 404 can be configured to retrieve the transmit weights for each antenna element 112 from the repository, and to send the retrieved weights and data defining the interrogation signal to the transceiver, for controlling the assembly 100 to generate the interrogation signal. The controller 404 can further be configured, to control the assembly 100 for receiving tag responses, to retrieve receive weights for each antenna element 112 and transmit the receive weights to the transceiver 408 for use in controlling the assembly 100 to detect signals arriving at the assembly 100 via a receive beam 454. The repository 416 may store a plurality of receive weights for each antenna element 112, permitting the generation of a plurality of receive beams 454 (e.g. at different azimuth and elevations).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An antenna assembly for a radio frequency identification (RFID) reader, the antenna assembly comprising:
   a support member having an inner surface and an opposing outer surface;
   a first bifilar helical antenna element wound about a first helical axis extending from the outer surface of the support member, wherein the first helical axis is exclusive to the first helical antenna element;
   a first control terminal on the support member, electrically connected with the first bifilar helical antenna element;
   a second bifilar helical antenna element wound about a second helical axis extending from the outer surface of the support member, wherein the second helical axis is exclusive to the second helical antenna element;
   a second control terminal on the support member, electrically connected with the second bifilar helical antenna element;
   a first plurality of additional bifilar helical antenna elements wound about respective helical axes extending from the outer surface at the primary radius from the center of the outer surface; and a second plurality of additional bifilar helical antenna elements wound about respective helical axes extending from the outer surface at the secondary radius from the center of the outer surface, wherein:

the first helical axis extends from the outer surface at a primary radius from a center of the outer surface;

the second helical axis extends from the outer surface at a secondary radius from the center of the outer surface;

the secondary radius is greater than the primary radius;

the first bifilar helical antenna element and the first plurality of additional bifilar helical antenna elements are arranged in a primary ring about the center of the outer surface;

the second bifilar helical antenna element and the second plurality of additional bifilar helical antenna elements are arranged in a secondary ring about the center of the outer surface; and the bifilar helical antenna elements of the primary ring have a primary height greater than a secondary height of the bifilar helical antenna elements of the secondary ring.

2. The antenna assembly of claim 1, wherein the outer surface is planar, and wherein the first and second helical axes are perpendicular to the outer surface.

3. The antenna assembly of claim 1, wherein the first and second control terminals are disposed on the inner surface of the support member; the antenna assembly further comprising:

a first electrical conduit extending through the support member from the first control terminal to the first bifilar helical antenna element; and a second electrical conduit extending through the support member from the second control terminal to the second bifilar helical antenna element.

4. The antenna assembly of claim 1, wherein the secondary ring consists of eight bifilar helical antenna elements.

5. The antenna assembly of claim 1, wherein the primary ring consists of six bifilar helical antenna elements.

6. The antenna assembly of claim 1, further comprising:

a first mast extending from the outer surface of the support member along the first helical axis, to support the first bifilar helical antenna element; and a second mast extending from the outer surface of the support member along the second helical axis, to support the second bifilar helical antenna element.

7. The antenna assembly of claim 6, wherein the first and second masts are cylindrical.

8. The antenna assembly of claim 1, wherein each first bifilar helical antenna element includes (i) a first volute wound from a first base through 180 degrees to a first summit, and (ii) a second volute wound from a second base opposite the first base, through 180 degrees to a second summit, and (iii) a short connecting the first summit and the second summit.

9. A radio frequency identification (RFID) reader, comprising:

an antenna assembly including:

a support member having an inner surface and an opposing outer surface;

a first bifilar helical antenna element wound about a first helical axis extending from the outer surface of the support member, wherein the first helical axis is exclusive to the first helical antenna element;

a first control terminal on the support member, electrically connected with the first bifilar helical antenna element;

a second bifilar helical antenna element wound about a second helical axis extending from the outer surface of the support member, wherein the second helical axis is exclusive to the second helical antenna element; and a second control terminal on the support member, electrically connected with the second bifilar helical antenna element;

a transceiver connected to the first and second control terminals;

a controller connected to the transceiver, and configured to transmit data to the transceiver for emission via the antenna assembly;

a first plurality of additional bifilar helical antenna elements wound about respective helical axes extending from the outer surface at the primary radius from the center of the outer surface; and a second plurality of additional bifilar helical antenna elements wound about respective helical axes extending from the outer surface at the secondary radius from the center of the outer surface, wherein:

the first helical axis extends from the outer surface at a primary radius from a center of the outer surface;

the second helical axis extends from the outer surface at a secondary radius from the center of the outer surface;

the secondary radius is greater than the primary radius;

the first bifilar helical antenna element and the first plurality of additional bifilar helical antenna elements are arranged in a primary ring about the center of the outer surface;

the second bifilar helical antenna element and the second plurality of additional bifilar helical antenna elements are arranged in a secondary ring about the center of the outer surface; and the bifilar helical antenna elements of the primary ring have a primary height greater than a secondary height of the bifilar helical antenna elements of the secondary ring.

* * * * *